United States Patent [19]

Hucker et al.

[11] 4,156,172
[45] May 22, 1979

[54] MAIN FIELD CURRENT TRANSIENT CONTROL CIRCUIT FOR DYNAMOELECTRIC MACHINES

[75] Inventors: David J. Hucker, Rockford, Ill.; Norbert L. Schmitz, Middleton, Wis.; Timothy F. Glennon, Rockford, Ill.

[73] Assignee: Sundstrand Corporation, Rockford, Ill.

[21] Appl. No.: 716,917

[22] Filed: Aug. 23, 1976

Related U.S. Application Data

[63] Continuation of Ser. No. 606,989, Aug. 22, 1975, abandoned.

[51] Int. Cl.$^2$ .................. H02K 19/00; H02P 1/50
[52] U.S. Cl. ........................... 322/68; 318/716; 322/69; 361/21
[58] Field of Search ............ 322/68, 69, 28; 361/20, 361/21, 33; 318/190, 191, 192, 193

[56] References Cited

U.S. PATENT DOCUMENTS

| | | | |
|---|---|---|---|
| 3,314,001 | 4/1967 | Brockman | 322/68 X |
| 3,350,613 | 10/1967 | Brockman et al. | 318/190 X |
| 3,582,736 | 6/1971 | Geib, Jr. | 318/193 X |
| 3,599,236 | 8/1971 | Hutchins | 318/193 X |
| 3,843,921 | 10/1974 | Hill | 322/28 |

FOREIGN PATENT DOCUMENTS

| | | |
|---|---|---|
| 1073062 | 6/1967 | United Kingdom. |
| 1109237 | 4/1968 | United Kingdom. |
| 1123542 | 8/1968 | United Kingdom. |
| 1217564 | 12/1970 | United Kingdom. |
| 1396784 | 6/1975 | United Kingdom. |
| 1433509 | 4/1976 | United Kingdom. |
| 476652 | 7/1975 | U.S.S.R. |

*Primary Examiner*—Robert J. Hickey
*Attorney, Agent, or Firm*—Ted E. Killingsworth; Michael B. McMurry; William R. Peoples

[57] ABSTRACT

In a synchronous generator-motor, having both its main armature windings and exciter winding located on the stator and both the main field winding and the exciter armature windings including a rectifier for providing DC current to the main field located on the rotor and also including a voltage regulator responsive to the main armature voltage for regulating the current applied to the exciter field; the effects of transient currents in the main field windings resulting from load removal during the generator mode of operation and the voltages induced during motor start-up are substantially reduced by utilizing a resistive circuit operatively controlled by a transistor switching network that is in turn responsive to the exciter voltage and the induced voltage in the main field windings.

13 Claims, 3 Drawing Figures

MAIN FIELD CURRENT TRANSIENT CONTROL CIRCUIT FOR DYNAMOELECTRIC MACHINES

CROSS-REFERENCE TO RELATED APPLICATIONS

This application is a continuation of the co-pending application Ser. No. 606,989 filed Aug. 22, 1975, now abandoned entitled "Main Field Current Transient Control Circuit for Dynamoelectric Machines."

BACKGROUND OF THE INVENTION

The invention relates to synchronous machines having the exciter armature windings, rectifier and main field winding on the rotor and more particularly, to circuitry for reducing the effect of transient voltages and currents in the main field winding and rectifier.

In synchronous machines having the main field windings, the exciter armature windings and the rectifier for supplying the main field with a DC current all located on the rotor, the relatively long transient recovery time for the field current when the load is removed from the main armature has posed a very significant problem. In addition, the necessity for protecting the rectifier and associated rotor components from the relatively high voltages generated in the main field when the synchronous machine, operated as a motor, is started from rest has similarly posed a very significant problem. Normally, when the machine is operating in a generating mode, a voltage regulator adjusts the current through the exciter field so as to provide the desired output voltage. Specifically, the exciter field current results in the generation in the exciter armature windings of a current which is rectified by the rectifier and applied to the main field winding to generate the desired generator output voltage. However, when the generator load is removed from the main armature, a portion of the main field current continues to flow for an appreciable amount of time due to the high inductance of the main field coil and the low resistance of the rectifier diodes. Thus, the generator output voltage transient on load removal tends to be relatively high in amplitude and long in duration. A similar problem is encountered when the synchronous machine is used as an induction motor utilizing the amortisseur winding as a squirrel cage. As the main armature windings are excited with a polyphase AC current, a rotating magnetic field is established which periodically sweeps by the single phase main field winding. The flux sweeping by the stationary or slowly moving rotor tends to generate potentially destructive high voltages in the field winding. Also, since the induced voltage is half-wave rectified by the rectifier, the resulting induced current in the main field tends to increase losses and produces torque cusps in the induction motor torque curve. One solution for the induction motor start-up problem has been to short-circuit the main field winding utilizing a centrifugal switch during start-up. The case of centrifugal switches for this purpose has proved to be, in some respects, unsatisfactory, since they tend to add mechanical complexity to the generator and additionally have moving parts and sliding contacts which provide maintenance problems and in some cases tend to be unreliable.

SUMMARY OF THE INVENTION

It is therefore an object of the invention to provide a dynamoelectric synchronous machine having its exciter armature rectifier, and main field located on the rotor, with a resistive circuit connected to the main field windings that is under control of a switch circuit which in turn is responsive to the excitation voltage in order to reduce generator output voltage transients.

It is a further object of the invention to provide a synchronous dynamoelectric machine having its exciter armature windings, rectifier and main field winding located on the rotor, with a load resistor connected across the main field winding and a transistor switching circuit responsive to the excitation voltage for effectively disconnecting the main field winding from the rectifier, thereby causing the main field current to flow through the load resistor during generator load removal and induction motor start-up.

It is an additional object of the invention to provide a synchronous dynamoelectric machine having its exciter armature windings, rectifier and main field windings located on the rotor, with: a load resistor connected between the main field winding and the rectifier; a first transistor circuit effective to permit the main field current to flow around the load resistor in the presence of the excitation voltage; and a transistor controlled bypass circuit around the rectifier, responsive to an induced alternating voltage in the main field coil, for eliminating the half-wave rectification of the induced main field current.

Because it eliminates the need for brushes and sliprings, the synchronous machine, having the main armature windings located on the stator with the main field winding located on the rotor along with the exciter armature windings and a rectifier to provide the main field with DC current, has found a wide variety of applications such as generators for aircraft. Typically, the output voltage of a synchronous generator is controlled or governed by the application of a current through the exciter field. The exciter field, normally located on the stator, induces an alternating voltage and current in the exciter armature windings rotating on the stator. The alternating current is rectified, usually by a bridge rectifier composed of semi-conductor diodes, into a DC current for use in the main field winding. The rotating magnetic field, produced by the direct current flowing through the rotating field winding, generates the voltage output in the main armature windings and hence the power output of the generator. Usually, the voltage output of the synchronous generator is controlled by a voltage regulator which monitors the voltage output of the main armature and adjusts the exciter field current accordingly.

Normally, as the load is removed from a synchronous generator, the output voltage of the generator increases and the voltage regulator reduces exciter field current to zero or a very low level. Even with the complete termination of current in exciter field, a certain proportion of the main field current will continue to flow due to the high inductance of the main field winding. The continuation of this transient field current results in significant difficulties in maintaining the voltage and power output of the synchronous generator within desired limits. Similarly, when the synchronous machine is used as a motor, the voltages and currents induced in the main field winding by the rotating magnetic field, produced by the application of a polyphase AC current to the main armature windings, results in undesirably high voltage peaks in the field windings and the undesirable torque characteristics previously described.

The first approach to solving the problem of transient currents in the main field winding and rectifier includes the insertion of a load resistor in parallel with the main field winding. A transistor is connected between the main field winding and the rectifier and is responsive to voltage generated in the exciter armature. When the exciter field current is shut off, for example, when the load has been removed from the generator or when the synchronous machine is being used as a motor and is in a start-up phase of operation, the transistor acts to direct the main field current through the load resistance. The value of the resistance is selected so as to quickly attenuate the field current when the load has been removed from the generator and to provide a load for the main field winding when the synchronous machine is being used as a motor.

A second approach involves inserting a load resistor between the main field winding and the rectifier along with a by-pass circuit controlled by a transistor. The load transistor is also responsive to the exciter voltage so as to provide a relatively low resistance current path during normal generator or motor operation. When the load is removed from the generator, the exciter voltage causes the by-pass transistor circuit to be disconnected, which in turn causes the field current to flow through both the load resistor and the rectifier. In addition, circuitry is provided to cause the current, induced in the main field winding when the synchronous machine is in the start-up phase of motor operation, to flow through the load resistor and the rectifier when the induced current is compatible in direction with the rectifier and to by-pass the rectifier when the induced current is not compatible with the direction of the rectifier. In this manner, a load is provided for the main field current during motor start-up and the destabilizing effects of the rectifier on the alternating current induced in the main field are eliminated.

DETAILED DESCRIPTION OF THE INVENTION

Figure 1:
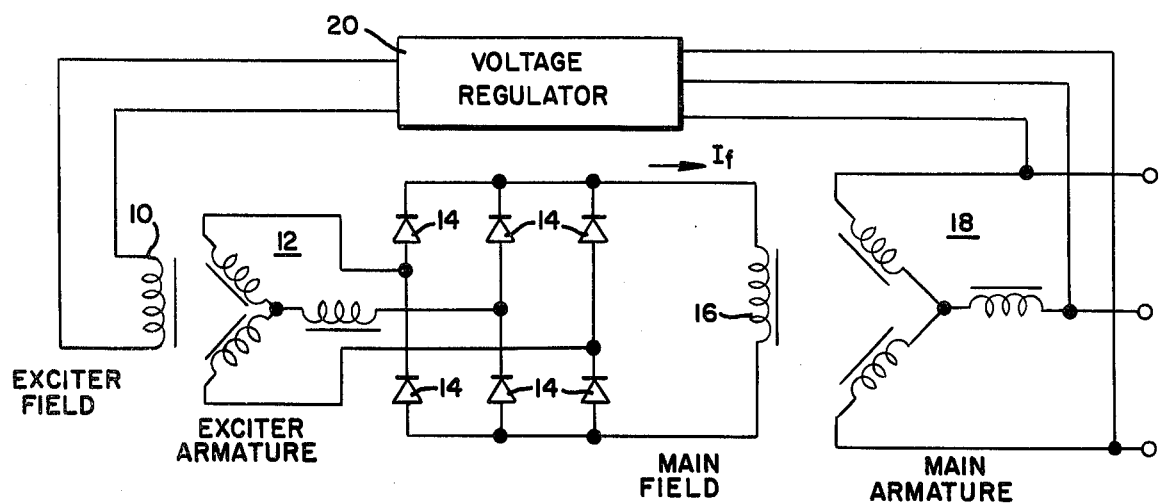
FIG. 1 is a schematic diagram of a synchronous machine having its exciter armature, rectifier and main field mounted on the rotor.

A typical synchronous dynamoelectric machine is illustrated in the schematic diagram of FIG. 1. In this particular type of brushless, synchronous machine the exciter field 10 is located on the machine's stator. The exciter armature windings 12 are located on the rotor and as such, rotate through the flux field generated by the exciter field winding 10. Alternating current, generated in the exciter armature 12 is rectified by the bridge rectifier composed of the semi-conductor diodes 14. The rectified DC current, represented by $I_f$, flows through the field winding 16 and is referred to as the main field current. The rotating flux produced by the main field winding 16 induces alternating voltages in the main armature windings 18, which are located on the stator. Normally, the output of the main armature will be a three-phase voltage. As is well-known in the art, the voltage output of the synchronous generator is controlled by a voltage regulator 20 which measures the voltage output of each phase of the main armature 18 and adjusts the current applied to the exciter field 10 in order to maintain the desired voltage output of the generator.

Figure 2:
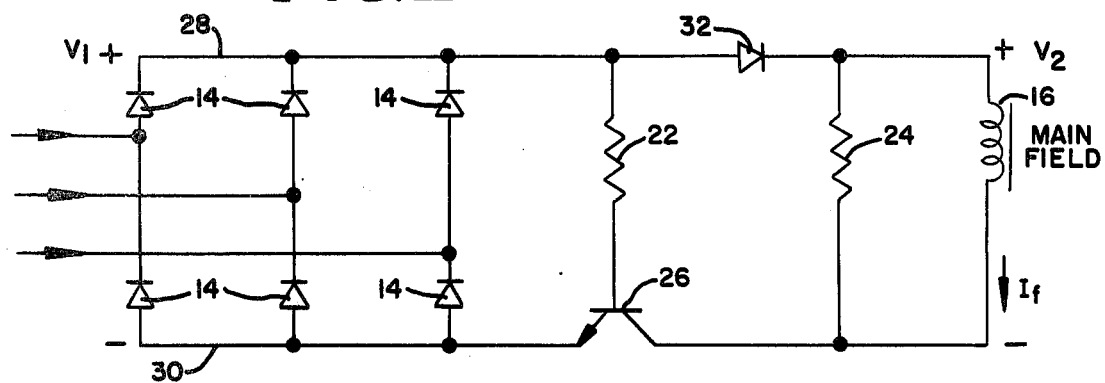
FIG. 2 is a schematic diagram of the main field winding and rectifier circuit including a first main field current control circuit.

A circuit illustrating the first main field current control circuit is presented in FIG. 2. Added to the rectifier semi-conductor diodes 14 and the main field winding 16 of the conventional circuit of FIG. 1 are the resistors 22 and 24 and the NPN transistor 26. During normal generator operation, when an excitation current is being applied to the exciter field, the rectifiers will apply a positive voltage $V_1$ across lines 28 and 30. In addition to causing the field current $I_f$ to flow through the main field winding 16 and the diode 32, the positive voltage $V_1$ will apply a positive voltage across the base and emitter terminals of transistor 26, thereby placing transistor 26 in a conducting state. Since, at this point, transistor 26 is in a conducting state with relatively little internal resistance, the majority of the field current $I_f$ will flow through the main field winding 16 with very little flowing through the load resistor 24. However, when the load is removed from the main armature windings 18 of FIG. 1, the increased voltage output of the main armature windings 18 will cause the voltage regulator to decrease or completely stop the current flow through the exciter field 10. This will result in the elimination of the positive voltage $V_1$ and the reversal of voltage $V_2$, due to discharge of the main field, thereby having effect of shutting off the transistor 26. The resultant main field current $I_f$ which continues to flow through the main field winding 16 due to its inductance will, of necessity, flow through the load resistor 24 where it is rapidly attenuated. Therefore, by selecting an appropriate value of the load resistor 24, the duration of the transient current and voltage produced by the inductive nature of the main field winding 16 can be greatly reduced. It should be noted that the resistor 24 can be replaced with other types of voltage producing or current attenuating devices such as gas discharge tubes or zener diodes.

In the case where the machine as represented by FIG. 2 is being operated as a motor, the resistor 24 will provide a load resistance for the current induced in the main field windings 16 by the polyphase AC current applied to the main armature winding 18. When the motor is in the start-up phase of operation, current is not normally applied to the exciter field 10 and as a result, there is no positive voltage $V_1$ so that the transistor 26 is off, thereby forcing all of the induced current through the resistor 24. In addition, the diode 32, inserted between the main field winding 16 and the base of the transistor 26, prevents the positive voltage induced in the main field winding 16 from switching the transistor 26 into a conducting state.

Figure 3:
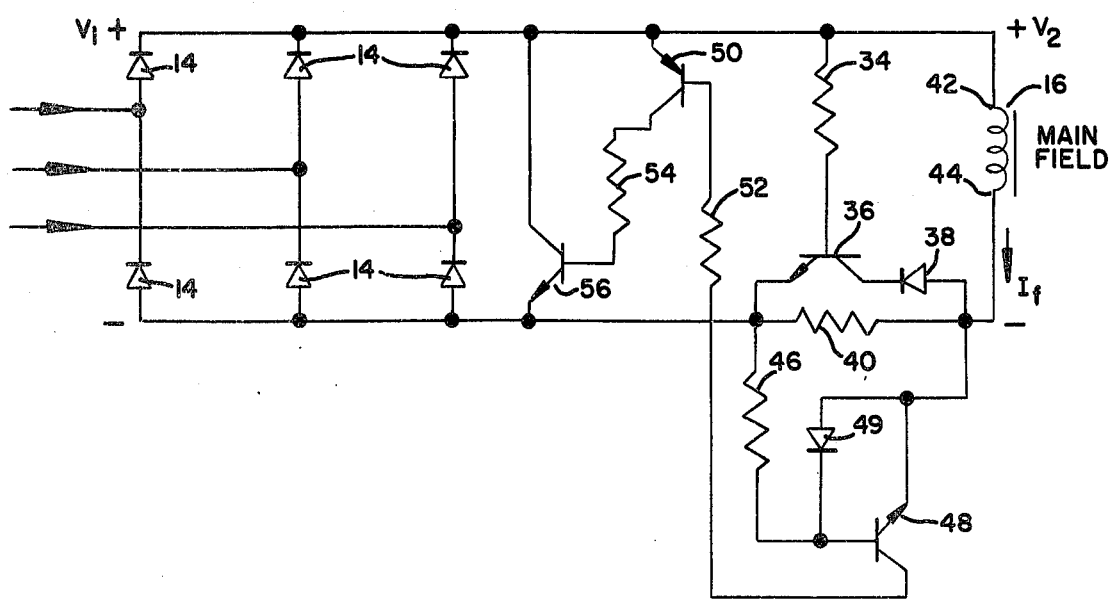
FIG. 3 is a schematic diagram of the main field and rectifier circuit including a main field current control circuit.

A second main field control circuit is set forth in FIG. 3. Here a resistor 34 is connected to the base of an NPN transistor 36 and serves to switch the transistor 36 into a conducting state when the voltage $V_1$ is positive. During normal generator operation the positive voltage $V_1$ results in the transistor 36 being in a conducting state, thus permitting the main field current $I_f$ to flow through a diode 38 and by-passing a load resistor 40. As in the previous case when the load is removed from the main armature windings 18, the positive voltage $V_1$ will be removed and $V_2$ will reverse, thus shutting off the transistor 36, resulting in the flow of the induced field current $I_f$ through the load resistor 40 and the rectifier diodes 14. Since the induced main field current $I_f$ is forced to flow through load resistor 40, it will be rapidly attenuated, depending upon value of the resistor.

During start-up in the motor phase of operation, the application of a polyphase AC voltage to the main armature windings 18 induces alternating voltages in the main field winding 16. Again, the positive voltage $V_1$ produced by the rectifier diodes 14 will not be present during the start-up phase of operation. When a positive voltage $V_2$ is induced at the main field winding 16, current will flow through the resistor 34 and through the base-emitter junction of transistor 36. A portion of the current will also flow through resistor 46 to the base of NPN transistor 48, having the effect of placing transistor 48 into a conducting state. A diode 49 serves to protect the emitter-base junction of transistor 48 during generator load removal. Since at this point transistor 48 is in a conducting state, the combination of the positive voltage on terminal 42 with the conducting state of transistor 48 will cause PNP transistor 50, responding to a current through resistor 52, to be switched on. The resultant current through the emitter-collector junction of transistor 50 and resistor 54 will serve to switch on the NPN transistor 56. Thus, the net result of an induced positive voltage on terminal 42 of the main field will be to cause the induced main field current $I_f$ to flow through transistor 56 and load resistor 40, thereby having the dual effect of providing the main field with a load resistance and by-passing the rectifier represented by the diodes 14. Because of motor operation the main field becomes a source and a positive induced voltage on terminal 42 induces the main field current $I_f$ to flow in a direction opposite to the normal direction of flow and opposite to the direction of rectifier 14 conduction, the activation of the by-pass circuit including transistor 56 eliminates the half-wave rectification effect on the alternating current $I_f$ induced during motor start-up. When the induced voltage on the main field winding 16 reverses to provide a positive voltage on terminal 44, the induced field current will flow through load resistor 40 and the rectifier diodes 14. This is due to the fact that the negative voltage on terminal 42 will serve to keep transistor 36 off, or in a nonconducting state, thereby resulting in a single current path through resistor 40 and the rectifier diodes 14.

To summarize the operation in the motoring mode of the circuit illustrated in FIG. 3, when a positive voltage is induced on terminal 42 of the main field winding 16 the induced main field current $I_f$ by-passes the rectifier diodes 14 by flowing through transistor 56 and through load resistor 40. By the same token, when a positive voltage is induced on terminal 44, the current $I_f$ will flow through load resistor 40 and through the rectifier diodes 14. Thus a load resistance is provided to the main field winding during motor start-up and the deleterious effects of half-wave rectification of the main field current are avoided as well.

We claim:

1. In a synchronous generator having: a main armature, a main field, an exciter armature including a rectifier for providing a rectified DC main field current flowing in a forward direction through the main field, a circuit for reducing transients in the main field circuit comprising:
   a resistive circuit including a load resistor connected in parallel with the main field winding operatively connected to the main field; and
   switch means including a transistor interposed between the main field winding and the rectifier and responsive to the excitation voltage for directing the current flowing through the main field in said forward direction through said resistive circuit in response to a reduction to the value of the excitation voltage generated in the exciter armature below a predetermined value.

2. The circuit of claim 1 additionally including diode means operatively connected between the main field and said transistor for preventing an induced voltage in the main field winding from placing said transistor in a conducting state.

3. In a synchronous generator having: a main armature, a main field, an exciter armature including a rectifier for providing a rectified DC main field current flowing in a forward direction through the main field, a circuit for reducing transients in the main field circuit comprising:
   a resistive circuit including a load resistor connected between the main field winding and the rectifier operatively connected to the main field; and
   switch means including a first transistor connected in parallel with said load resistor and responsive to said excitation voltage for directing the current flowing through the main field in said forward direction through said resistive circuit in response to a reduction to the value of the excitation voltage generated in the exciter armature below a predetermined value.

4. The circuit of claim 3 wherein said switch means additionally includes a by-pass transistor circuit, responsive to induced voltage in the main field winding, for permitting an induced main field current, flowing in a direction opposite to the rectifier, to by-pass the rectifier.

5. The circuit of claim 4 wherein said by-pass transistor circuit includes:
   a second transistor, operatively connected to and responsive to said first transistor, effective to switch from a first state to a second state when an induced voltage in the main field winding tends to cause said main field current to flow in a direction opposite to the direction of rectifier conduction; and
   a transistor network operatively connected in parallel with the rectifier and responsive to said second transistor state to provide a by-pass path around the rectifier.

6. In a synchronous generator having the main armature windings and the exciter field secured to the stator, a main field circuit secured to the rotor comprising:
   exciter armature windings responsive to an excitation voltage for producing a main field current;
   a rectifier circuit operatively connected to said armature windings for rectifying said main field current;
   a main field winding operatively connected to said rectifier circuit;
   a load resistor operatively connected in parallel with said main field winding;
   a transistor switch circuit operatively connected between said main field winding and said rectifier circuit, responsive to said excitation voltage, and effective to cause an induced main field current to flow through said load resistor in the absence of said excitation voltage.

7. The circuit of claim 6 additionally including a diode interposed between said main field winding and said transistor switch circuit to prevent an induced voltage in said main field winding from placing said transistor circuit in a conducting state.

8. In a synchronous generator having the main armature windings and the exciter field secured to the stator, a main field circuit secured to the rotor comprising:
 exciter armature windings responsive to an excitation voltage for producing a main field current;
 a rectifier circuit operatively connected to said exciter armature windings for rectifying said main field circuit;
 a main field winding operatively connected to said rectifier circuit;
 a load resistor operatively connected between said rectifier and said main field winding;
 a first transistor circuit operatively connected in parallel to said load resistor and responsive to said excitation voltage, effective to permit said main field current to flow around said load resistor in the presence of a predetermined excitation voltage;
 a second transistor circuit, operatively connected to said first transistor circuit and said main field winding, effective to switch from a first state to a second state when an induced voltage in said main field winding tends to cause said main field current to flow in a direction opposite to the direction of rectifier conduction;
 a transistor network, operatively connected in parallel with said rectifier circuit and responsive to the state of said second transistor circuit, effective to provide a by-pass circuit around said rectifier circuit.

9. In a synchronous generator having: a main armature, a main field, an exciter armature including a rectifier for providing DC current to the main field, a circuit for reducing transients in the main field circuit comprising:
 a resistive circuit operatively connected to the main field wherein said resistive circuit includes a load resistor connected in parallel with the main field winding; and
 switch means for directing the main field current through said resistive circuit in response to a reduction in the value of the excitation voltage generated in the exciter armature below a predetermined value wherein said switch means includes a transistor interposed between the main field winding and the rectifier and responsive to the excitation voltage, thereby being effective to direct the main field current through said resistive circuit in the relative absence of the excitation voltage.

10. The circuit of claim 9 additionally including diode means operatively connected between the main field and said transistor for preventing an induced voltage in the main field winding from placing said transistor in a conducting state.

11. In a synchronous generator having: a main armature, a main field, an exciter armature including a rectifier for providing DC current to the main field, a circuit for reducing transients in the main field circuit comprising:
 a resistive circuit operatively connected to the main field wherein said resistive circuit includes a load resistor connected between the main field winding and the rectifier; and
 switch means for directing the main field current through said resistive circuit in response to a reduction in the value of the excitation voltage generated in the exciter armature below a predetermined value wherein said switch means includes a first transistor connected in parallel with said load resistor and responsive to said excitation voltage.

12. The circuit of claim 11 wherein said switch means additionally includes a by-pass transistor circuit, responsive to induced voltage in the main field winding, for permitting an induced main field current, flowing in a direction opposite to the rectifier, to by-pass the rectifier.

13. The circuit of claim 12 wherein said by-pass transistor circuit includes:
 a second transistor, operatively connected to and responsive to said first transistor, effective to switch from a first state to a second state when an induced voltage in the main field winding tends to cause said main field current to flow in a direction opposite to the direction of rectifier conduction; and
 a transistor network operatively connected in parallel with the rectifier and responsive to said second transistor state to provide a by-pass path around the rectifier.

* * * * *